United States Patent Office 3,070,566
Patented Dec. 25, 1962

3,070,566
SILICONE ELASTOMERS
Siegfried Nitzsche and Manfred Wick, Burghausen, Germany, assignors to Wacker-Chemie G.m.b.H., Munich, Bavaria, Germany
No Drawing. Filed Feb. 5, 1960, Ser. No. 6,869
Claims priority, application Germany Feb. 19, 1959
8 Claims. (Cl. 260—37)

This invention relates to novel silicone rubber stocks capable of vulcanizing at room temperature and susceptible of control of the modulus of the ultimate rubber.

Room temperature vulcanizing silicone elastomers are recent developments in the silicone art. Such materials are disclosed and claimed in United States patent application Serial No. 602,081, filed August 3, 1956, wherein the room temperature vulcanizing silicone elastomers are mixtures of (1) linear diorganosiloxane polymers having hydroxy radicals as endblockers, (2) cross linking agents such as methylhydrogensiloxanes or organosilicates and polysilicates, and (3) catalysts such as metal oxides, metal salts such as acetic acid, dibutylamine, chloroplatinic acid, lead octoate, zirconium acetyl acetonate, tin oleate, tetraethyl lead, dibutyl tin dilaurate, dibutyl tin dimaleinate, dibutyl tin diacetate, tin recinoleate, cobalt naphthenate, chromium acetyl acetonate, phenyl mercury acetate, triethanolamine, polyethylene-imine, boric acid and oleic acid and other materials. Pigments, plasticizers and other additives have been suggested for the room temperature vulcanizing (hereinafter "RTV") silicone rubber stocks.

The known RTV silicone rubber stocks vulcanize and cure to form rubbers exhibiting a relatively high modulus. It is necessary to apply relatively large forces to elongate the rubber to its rupturing point.

The high modulus of the RTV silicone rubber is very desirable for many applications but high modulus has proved to be a disadvantage for some applications. For example, the RTV silicone rubber stocks have been used as sealants and for filling crevices between deck planks on ships. The high modulus developed by the rubber stock through vulcanization places undue stress upon the bond between the rubber and the adjoining material. Thus where wooden planks are joined with the rubber, the high modulus produces stress upon the bond between the vulcanized rubber and the wood and the bond may be ruptured. On the other hand, a vulcanized rubber of lower modulus would reduce or eliminate such stresses.

It is the primary object of this invention to introduce a novel RTV silicone rubber stock of controllable modulus. Another object is a low modulus RTV silicone rubber. Other objects and advantages of this invention are detailed in or will be apparent from the following disclosure and claims.

This invention is a composition of matter consisting essentially of a mixture of (1) linear diorganosiloxane polymer selected from (a) mixtures of hydroxy endblocked diorganosiloxane and triorganosilyl endblocked diorganosiloxane and (b) diorganosiloxane polymers having both triorganosilyl endblocking and hydroxy endblocking, (2) cross linking agent, and (3) catalyst.

The novel feature of this composition is the inclusion of triorganosilyl endblockers in the siloxane polymers employed. It is believed the hydroxyl content of the polymer has a direct effect on the number of cross links formed during vulcanization of the rubber and thus on the modulus of the ultimate rubber. By substituting polymers having non-reactive endblocking units, the amount of cross linking achieved during vulcanization is reduced and the modulus of the ultimate rubber is reduced.

The non-reactive endblocked diorganosiloxanes can be present as separate polymer units in mixtures of hydroxy endblocked diorganosiloxanes and triorganosilyl endblocked diorganosiloxanes. Alternatively, a linear polymer wherein some of the hydroxyl groups have been replaced by triorganosilyl endblockers can be employed. The preferred embodiment of the invention employs the mixture of hydroxy endblocked polymer and triorganosilyl endblocked polymer.

The hydroxy endblocked diorganosiloxane polymers are of the general formula

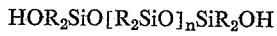
$$HOR_2SiO[R_2SiO]_nSiR_2OH$$

where each R is a monovalent hydrocarbon radical, at least 50 mol percent of the R substituents being methyl radicals and $n$ is 100 to 5,000, preferably 250 to 800. Operable polymers may have viscosities as low as 200 cs. at 25° C. and range up to gums exhibiting little or no flow at room temperature and the preferred polymers vary in viscosity from 1350 to 40,000 cs. at 25° C.

The triorganosilyl endblocked polymers operable herein are of the general formula

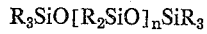
$$R_3SiO[R_2SiO]_nSiR_3$$

where R and $n$ are as above defined. In both the hydroxy endblocked and triorganosilyl endblocked polymers the organic substituents represented by R can be alkyl radicals such as methyl, ethyl and octadecyl; aryl radicals such as phenyl and anthracyl; alkenyl radicals such as vinyl, allyl and octadecenyl; alkaryl radicals such as tolyl, xylyl and methylnaphthyl; aralkyl radicals such as benzyl and phenylethyl; and cycloaliphatic radicals such as cyclopropyl and cyclohexyl. At least 50 mol percent of the organic substituents should be methyl radicals in order to obtain satisfactory physical properties in the ultimate rubber.

The ratio of hydroxy endblocked siloxane to triorganosilyl endblocked siloxane can vary over a wide range. As little as 1% by weight of the triorganosilyl endblocked siloxane has an effect on the ultimate properties of the rubber and as much as 60% by weight of the triorganosilyl endblocked material can be used without destruction of the RTV characteristics of the stock. The preferred range of proportion is from 5 to 30% by weight triorganosilyl endblocked siloxane and 95 to 70% by weight of the hydroxy endblocked siloxane polymer.

The linear diorganosiloxane polymers containing both hydroxy- and triorganosilyl endblocking are of the general formula

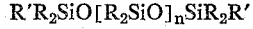
$$R'R_2SiO[R_2SiO]_nSiR_2R'$$

where each R and $n$ are as above defined and R' may be a hydroxy radical or a monovalent hydrocarbon radical. At least 40 mol percent and up to 99 mol percent of the substituents represented by R' must be hydroxy radicals.

The cross linking agents employed herein are selected from alkyl orthosilicates, alkyl polysilicates and organohydrogensiloxanes. Illustrative of the operable cross linking agents are ethylorthosilicate and methylorthosilicate as well as ethyl polysilicate and propylsilicates. The operable organohydrogensiloxanes are polymers of the unit formula RHSiO where R is as above defined having a viscosity ranging from very thin fluid (e.g., .5 cs. at 25° C.) to thick fluids (e.g., 50,000 cs. at 25° C.). The organohydrogensiloxane polymers can be endblocked with hydrogen atoms, hydroxy radicals or triorganosilyl groups as described above. However, the cross linking organohydrogensiloxane polymer must contain an average of at least 2 silicon bonded hydrogen atoms per molecule. Preferred are the methylhydrogensiloxane polymers of the unit formula $(CH_3)HSiO$ endblocked with hydroxy radicals and/or trimethylsilyl groups. The cross linking agent is added to the base siloxane in amounts of from 0.5 to 10% by weight, based on the weight of the base siloxane.

The catalysts employed in this invention are organic acids and bases, metal salts, metal salts of organic acids, metal chelates and organo-metallic compounds. The following compositions are illustrative of the operable catalysts: acetic acid, dibutyl amine, chloroplatinic acid, lead octoate, zirconium acetyl acetonate, tin oleate, tetraethyl lead, dibutyl tin dilaurate. The organic tin compounds such as dibutyl tin dimaleinate, dibutyl tin acetate and other diorgano tin acylates work most rapidly. The catalysts are employed in quantities of .1 to 5% by weight based on the weight of the diorganosiloxane. Increasing the proportion of catalyst present decreases the cross linking time and when the catalyst is present in excess of 5% by weight the cross linking time is too short to be practical.

The use of inert fillers in the compositions of this invention is preferred but is not required. The well-known natural and synthetic, organic and inorganic fillers widely used in the silicone rubber art can be employed herein. Suitable fillers include finely divided metal oxides such as $TiO_2$, quartz flour, diatomaceous earth, calcium carbonate, gypsum, sulfur, asbestos, barite, fume silica, silica aerogels, cork dust, carbon blacks, glass frit, wood flour and a host of other materials. The fillers can be employed in amounts of from 5 to 100 parts filler (preferably 10 to 80 parts) per 100 parts by weight of siloxane polymer.

Other additives which can be present in these compositions are pigments, heat stability additives, compression set additives, synthetic plasticizers and softeners, flavorings such as peppermint oil, anise oil, eucalyptus oil, and lemon oil and other standard additives known in the art.

The use of mixtures of triorganosilyl endblocked diorganosiloxane polymers and hydroxy endblocked diorganosiloxane polymers permits the preparation, storage, commercial sale, and use of the RTV silicone rubber in the form of two stable paste-like components. It is now feasible to prepare two separate mixtures of the RTV silicone rubber stocks and pack the mixtures in two cartons, tubes or other container. This system of packaging the RTV silicone rubber stocks is particularly advantageous when the materials are to be used for dental impressions, seals, as joint fillers and for other commercial and artistic uses.

The RTV silicone rubbers presently sold require that the curing catalyst be packaged separately from the siloxane polymer. If the catalyst is packaged with the siloxane polymer, further polymerization of the polymer through condensation of the endblocking hydroxy radicals will occur and the progressively higher polymer becomes elastomeric and useless after a few days of storage.

Furthermore, the reactivity of cross linking agent and catalyst often requires separate packaging, making it difficult to obtain the proper proportion of siloxane polymer, cross linking agent and catalyst. The rate of vulcanization is, in general, dependent upon the proportions of ingredients present hence the proper proportions are important. When cross linking agent and/or catalyst are packaged entirely separate from the siloxane polymer, proper proportions and adequate disbursement of catalyst through the polymer mixture may be definite if not impossible.

With the compositions of the present invention, the cross linking agent is mixed with the hydroxy endblocked diorganosiloxane polymer and the catalyst is mixed with the triorganosilyl endblocked diorganosiloxane polymer. Each mixture can contain fillers, pigments, flavorings and other additives. The separate mixtures can be prepared on a mill, in a mixer or by any other desired means including manual mixing.

An example of the versatility and flexibility of the compositions of this invention follows:

Composition A is prepared by mixing 100 parts hydroxy endblocked dimethylsiloxane polymer of 20,000 cs. viscosity, 11 parts trimethylsilyl endblocked dimethylsiloxane polymer of 28 cs. viscosity and 50 to 100 parts filler and other additives.

Composition B is prepared by mixing 100 parts trimethylsilyl endblocked dimethylsiloxane polymer of 20,000 cs. viscosity, 4 parts dibutyl tin dilaurate and 50 to 100 parts of filler and other additives. The filler and additives in compositon A can be totally different from those in composition B. Thus the consistency of the ultimate mixture of compositions A and B, the working time of the ultimate mixture, the physical properties of the vulcanized rubber and even the color of the rubber can be controlled by varying the proportions of composition A and composition B employed in the ultimate mixture. Compositions A and B are completely compatible and mixing them to obtain an even dispersion of filler, cross linking agent and catalyst is a simple matter. Any mixture of compositions A and B containing at least 40% by weight of the hydroxy endblocked siloxane will vulcanize at room temperature. However the materials will vulcanize more rapidly with higher proportions of hydroxy endblocked siloxane as well as with higher temperatures. For practical usage, a minimum of 70% of the siloxane present should be hydroxy endblocked.

The compositions of this invention can be used for taking dental impressions, as a sealant for joints between metals, glass, wood and other widely diverse materials, as a molding material for type, fine engravings and so forth, and in any other of the known uses for RTV siloxane elastomers.

The examples following are included to aid those skilled in the art in understanding and practicing this invention. The claims properly delineate the scope of the invention. All parts and percentages in the examples are based on weight unless otherwise specified. The viscosities were all measured at 25° C. and all temperatures are stated as the centigrade scale.

*Example 1*

100 g. of a hydroxy endblocked dimethylsiloxane polymer of 17,800 cs. viscosity was mixed with 100 g. of quartz flour, 1 g. of dibutyl tin dilaurate and 1 g. of ethyl orthosilicate $[Si(OC_2H_5)_4]$. This mixture vulcanized at room temperature within six hours to form a siloxane rubber having a modulus of 400 pounds per square inch at an elongation of 150%.

A second mixture identical to the foregoing except that a mixture of 20 g. of trimethylsilyl endblocked dimethylsiloxane of 20,000 cs. viscosity and 80 g. of the described hydroxy endblocked dimethylsiloxane polymer was used in place of the 100 g. of hydroxy endblocked dimethylsiloxane polymer. The resulting mixture vulcanized at room temperature in about 6 hours to form a rubber having a modulus of only 50 pounds per square inch at an elongation of 150%.

*Example 2*

100 g. of hydroxy endblocked dimethylsiloxane of 15,000 cs. viscosity was mixed with 50 g. diatomaceous earth, 1 g. dibutyl tin dilaurate and 1 g. ethyl orthosilicate. After 8 hours at room temperature this mixture had vulcanized to a rubber having a modulus of 356 pounds per square inch at an elongation of 150%. A dimethylsiloxane polymer of 15,000 cs. viscosity having hydroxy endblocking and containing .02 mol trimethylsilyl endblocking per mol of dimethylsiloxane was substituted for the hydroxy endblocked siloxane in the above formulation. This material cured in 8 hours at room temperature to a rubber having a modulus of 106 pounds per square inch at an elongation of 150%.

*Example 3*

100 parts of a hydroxy endblocked dimethylsiloxane polymer with a viscosity of 23,000 cs. were milled on a 3-roll mill with 75 parts of quartz flour, 12 parts of trimethylsilyl endblocked methylhydrogen siloxane polymer with a viscosity of 22 cs. and 0.2 part of red iron oxide. The milled mixture was filled into a tube labeled tube A.

A mixture of 100 parts of a trimethylsilyl endblocked dimethylsiloxane polymer of 32,000 cs. viscosity, 100 parts calcium carbonate, 5 parts dibutyl tin dilaurate, 10 parts sulfur and .1 part peppermint oil were thoroughly milled on a 3-roll mill. This mixture was filled into a tube labeled tube B.

The contents of tubes A and B did not undergo noticeable physical or chemical change upon storage. Equal amounts of material from each of tubes A and B were mixed and within 5 minutes at room temperature the mixture had vulcanized to a highly elastic silicone rubber. The vulcanized rubber was subjected to a 5-hour extraction with xylene and the trimethylsilyl endblocked dimethylsiloxane polymer could not be removed. This shows the trimethylsilyl endblocked polymer was co-condensed with the hydroxy endblocked polymer during the cross linking reaction.

It is quite unexpected that the triorganosilyl endblocked polymer would be chemically tied into the hydroxy endblocked polymer by the cross linking reaction. The result of this chemical union is that a single polymeric network is obtained rather than a polymeric network and extractable plasticizer or softener. It is probable that Si—O bonds in the siloxane polymers in the mixture are split and recondensed under the influence of the cross linking catalyst but this invention is in no way dependent upon this explanation of patentability.

*Example 4*

A mixture of 100 parts of hydroxy endblocked diorganosiloxane polymer consisting of 75.5 mol percent dimethylsiloxane units and 24.5 mol percent phenylmethylsiloxane units with an average molecular weight of 100,000, 25 parts TiO$_2$, 25 parts quartz flour, 5 parts sulfur, 15 parts hydroxy endblocked methylhydrogensiloxane polymer with an average molecular weight of 600, and .1 part anise oil was milled on a 3-roll mill and poured into container A. A mixture of 100 parts of a triphenylsilyl endblocked diorganosiloxane with an average molecular weight of 75,000 and composed of 95 mol percent dimethylsiloxane units and 5 mol percent methylvinylsiloxane units, 75 parts quartz flour, 20 parts diatomaceous earth, 2.5 parts dibutyl tin acetate and 5 parts copper phthalocyanine was milled on a 3-roll mill and placed in container B. Equal parts of the mixture from containers A and B were mixed and placed in a metal dental impression spoon. The material vulcanized at room temperature within 3.5 minutes after it had been placed in the oral cavity. The tooth impression obtained was form-constant, extremely accurate and highly elastic.

*Example 5*

When a mixture is prepared on a 3-roll mill consisting of 100 parts of hydroxy endblocked diorganosiloxane polymer of 10,000 cs. viscosity comprising a copolymer of 50 mol percent dimethylsiloxane units, 45 mol percent methylphenylsiloxane units and 5 mol percent ethylvinylsiloxane units, 50 parts vinyldimethylsilyl endblocked diorganosiloxane copolymer having a viscosity of 10,000 cs. comprising 60 mol percent dimethylsiloxane units, 39 mol percent ethylphenylsiloxane units and 1 mol percent methylmethallylsiloxane unit, 10 parts trimethylsilyl endblocked methylhydrogensiloxane polymer of 100 cs. viscosity and 2.5 parts catalyst selected from lead octoate, zirconium acetyl acetonate, tetraethyl lead, acetic acid and dibutyl amine, the resulting rubber stock vulcanizes at room temperature to a siloxane rubber of relatively low modulus.

*Example 6*

When Example 5 is repeated employing 10 parts of ethyl orthosilicate or of ethylpolysilicate in place of the methylhydrogensiloxane, the results achieved are similar to those of Example 5.

That which is claimed is:

1. A room temperature vulcanizing silicone rubber stock consisting essentially of a mixture of (1) 100 parts by weight of linear hydroxy endblocked diorganopolysiloxane polymer of the general formula $$HOR_2SiO[R_2SiO]_nSiR_2OH$$

where $n$ has an average value of from 100 to 5,000 and each R is a monovalent hydrocarbon radical, at least 50% of said radicals being methyl radicals, (2) 1 to 60 parts by weight of a linear triorganosilyl endblocked diorganosiloxane polymer of the general formula $$R_3SiO[R_2SiO]_nSiR_3$$

where R and $n$ are as above defined, (3) .5 to 10 parts by weight of a cross linking agent selected from the group consisting of alkyl orthosilicates, alkyl polysilicates and organohydrogensiloxane polymers having a viscosity of 5 cs. to 50,000 cs. at 25° C. and wherein the organic substituents are monovalent hydrocarbon radicals, and (4) .1 to 5 parts by weight of a catalyst selected from the group consisting of acetic acid, dibutylamine, chloroplatinic acid, lead octoate, zirconium acetyl acetonate, tin oleate, tetraethyl lead, dibutyl tin dilaurate, dibutyl tin dimaleinate, dibutyl tin diacetate, tin ricinoleate, cobalt naphthenate, chromium acetyl acetonate, phenyl mercury acetate, triethanolamine, polyethylene-imine, boric acid and oleic acid.

2. A silicone rubber stock in accordance with claim 1 wherein the organic substituents in the diorganosiloxane polymer (1) are methyl radicals.

3. A silicone rubber stock in accordance with claim 2 wherein the triorganosilyl endblocked diorganosiloxane polymer (2) is a trimethylsilyl endblocked dimethylsiloxane polymer.

4. A silicone rubber stock in accordance with claim 1 wherein the cross linking agent (3) is a linear organohydrogensiloxane.

5. A silicone rubber stock in accordance with claim 1 wherein the catalyst (4) is a dialkyl tin diacylate.

6. A room temperature vulcanizing silicone rubber stock prepared by mixing (1) 100 parts by weight of a linear hydroxy endblocked diorganosiloxane polymer of the general formula $HO(R_2)SiO[R_2SiO]_nSi(R_2)OH$ where each R is a radical selected from the group consisting of methyl, ethyl, phenyl and vinyl, at least 50 mole percent of the radicals represented by R being methyl radicals, and $n$ has an average value of 250 to 800, (2) 10 to 30 parts by weight of a linear triorganosilyl endblocked diorganosiloxane polymer of the general formula $$R_3SiO[R_2SiO]_nSiR_3$$

where R and $n$ are as above defined, (3) .5 to 10 parts by weight of cross linking agent selected from the group consisting of alkyl orthosilicates, alkyl polysilicates and organohydrogensiloxane polymers having a viscosity of .5 to 50,000 cs. at 25° C. and wherein the organic substituents are monovalent hydrocarbon radicals, and (4) .1 to 5 parts by weight of a dibutyl tin diacylate.

7. A composition in accordance with claim 6 further characterized in that it contains (5) 10 to 80 parts inert filler.

8. A composition in accordance with claim 7 wherein the inert filler is sulfur.

References Cited in the file of this patent

UNITED STATES PATENTS 2,819,236   Dickman _____ Jan. 7, 1958

FOREIGN PATENTS 216,878   Australia _____ Aug. 29, 1958